United States Patent Office 3,618,463
Patented Nov. 9, 1971

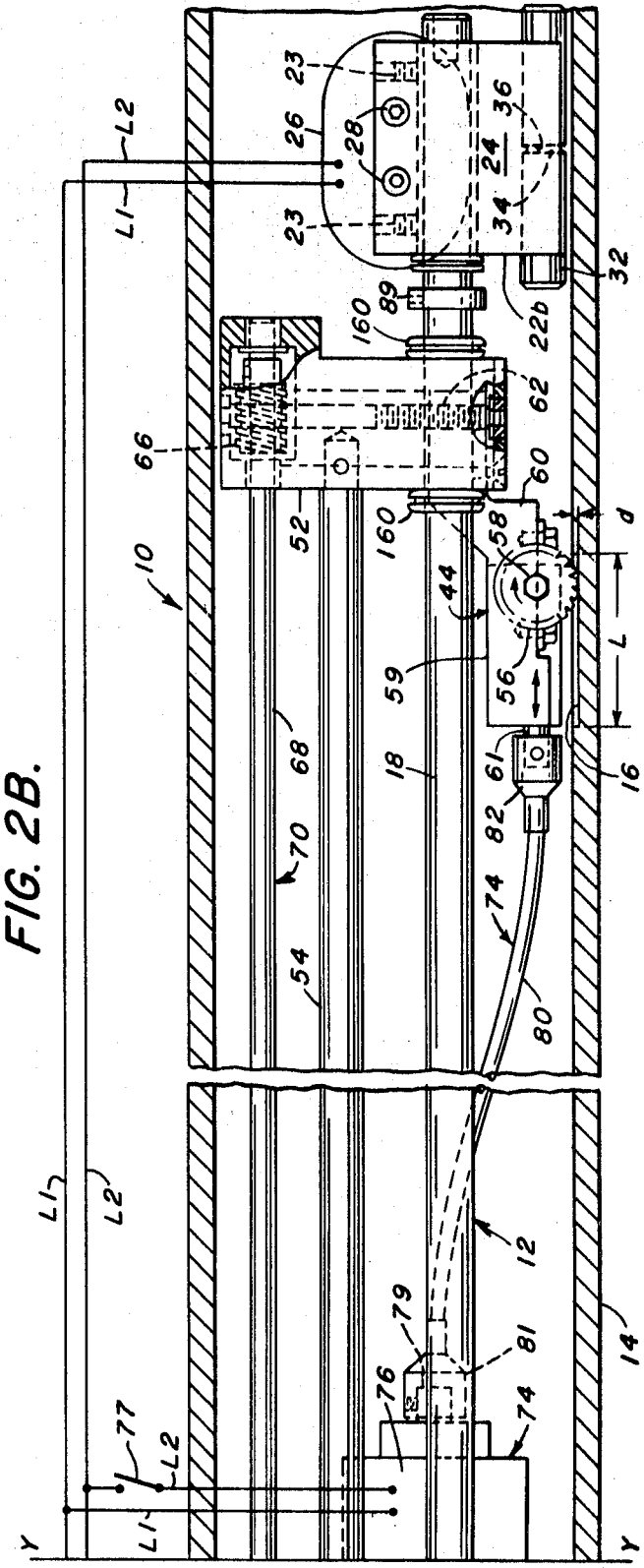

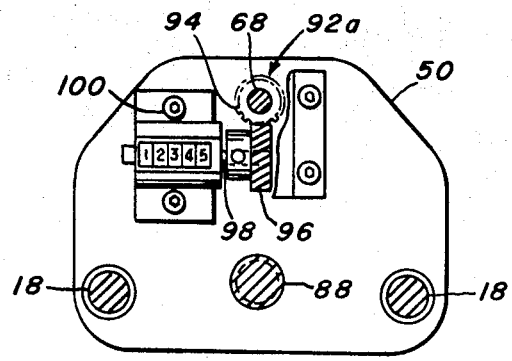
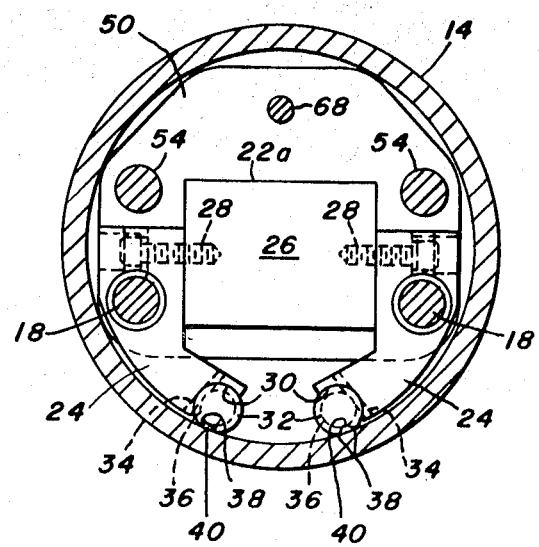
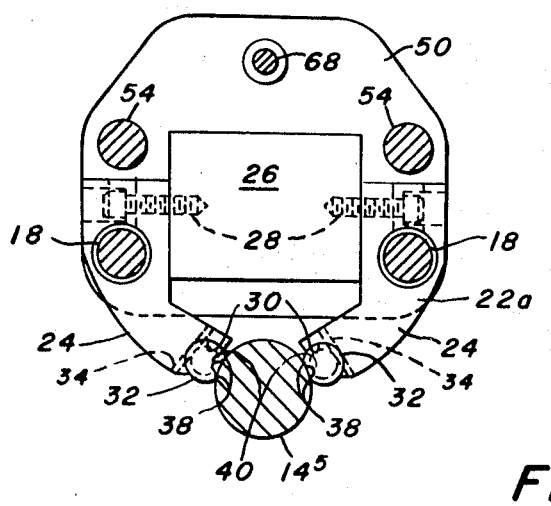
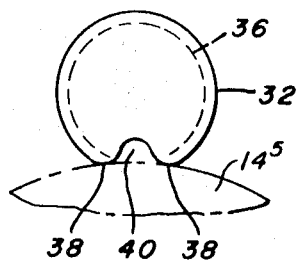
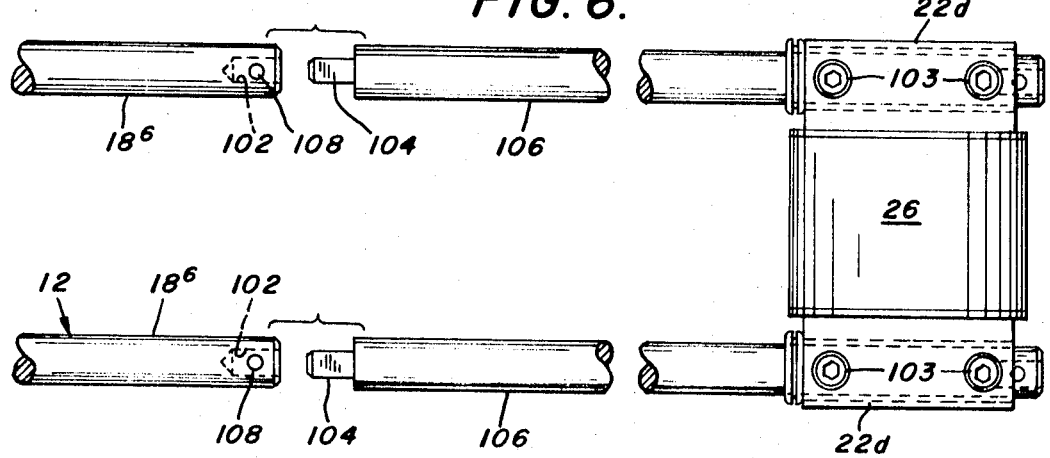

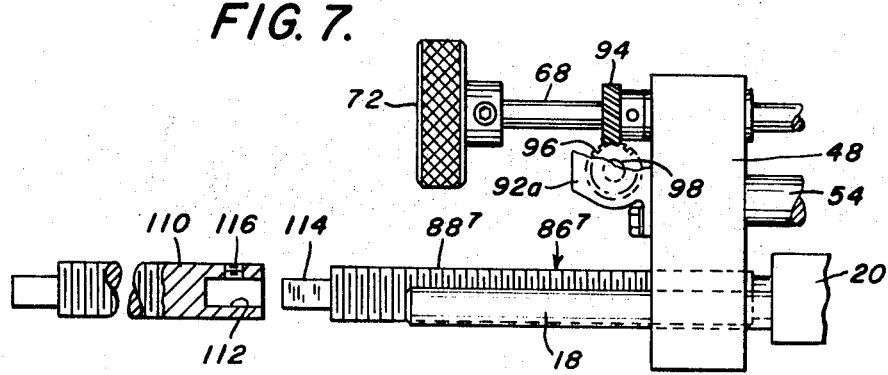
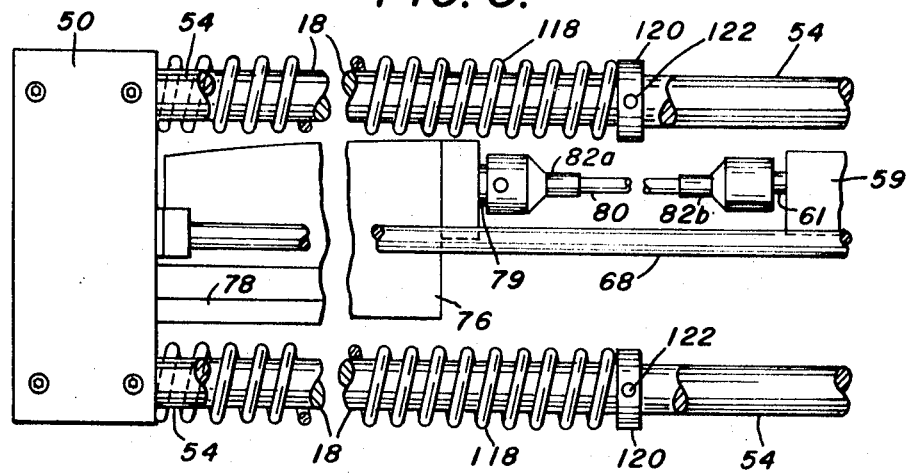
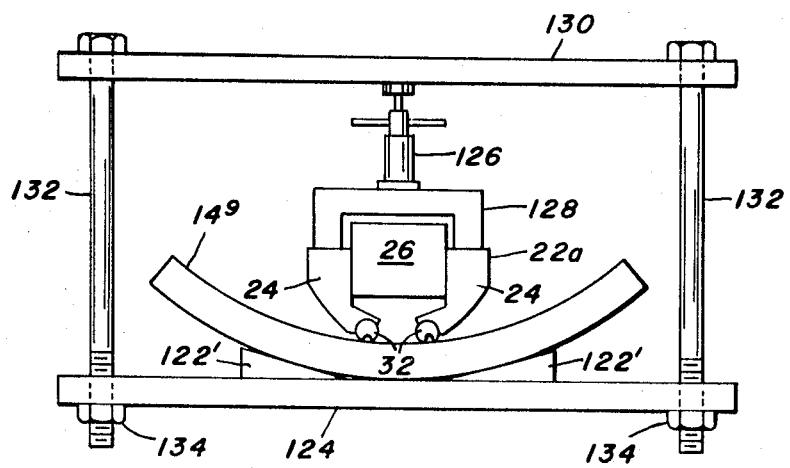
INVENTORS.
WAYNE L. BRINEY &
WILLIAM L. ZEMBERRY
By
Attorney

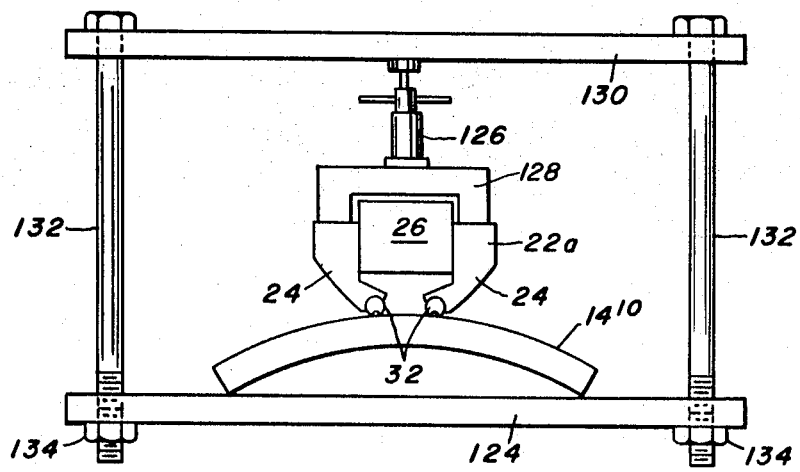
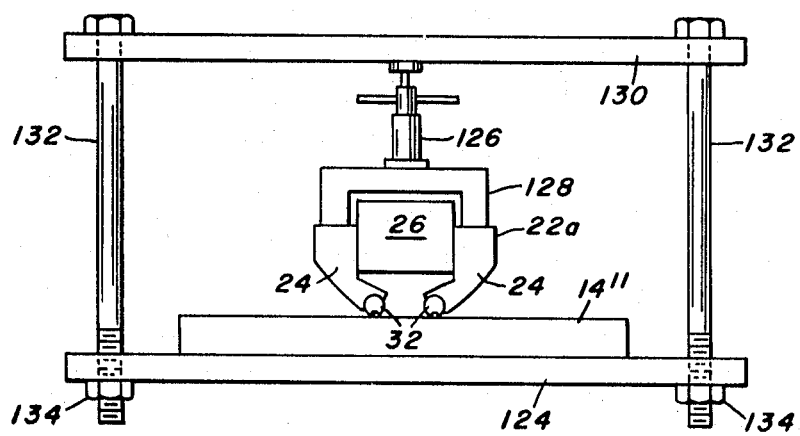
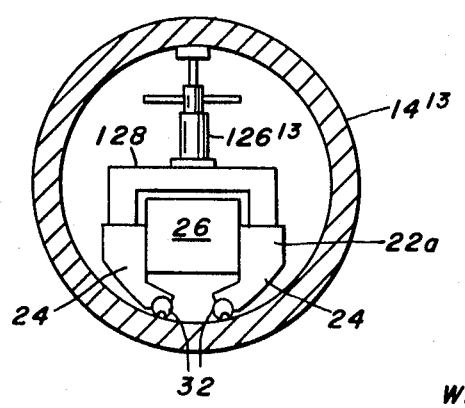
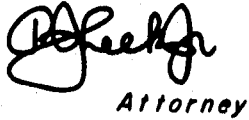

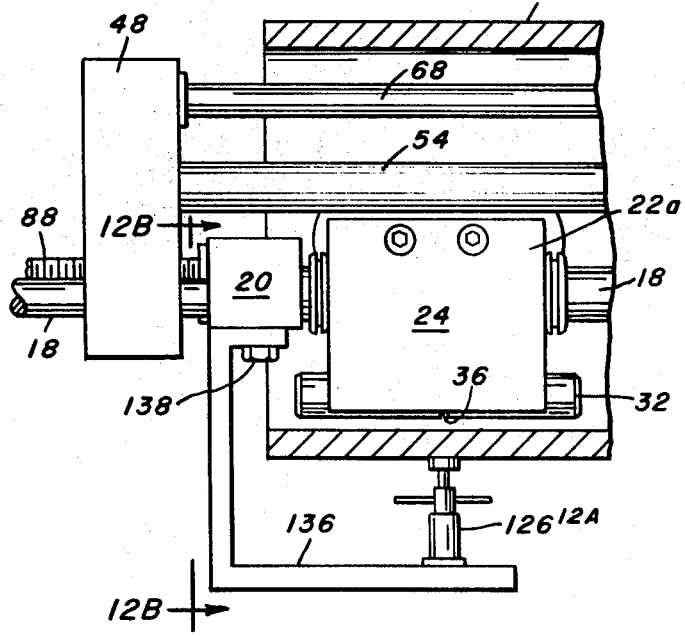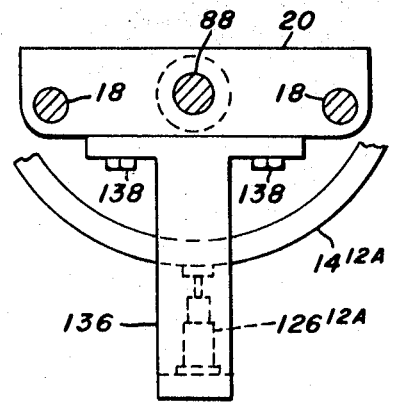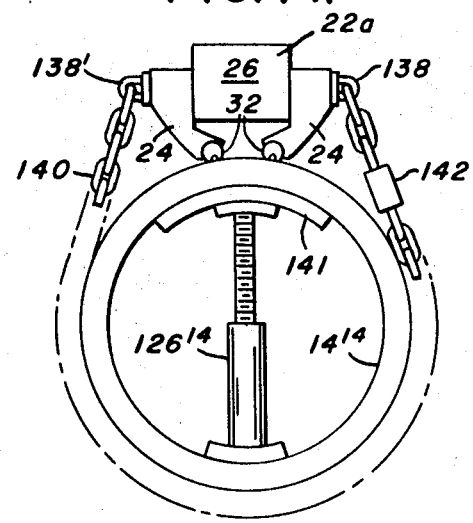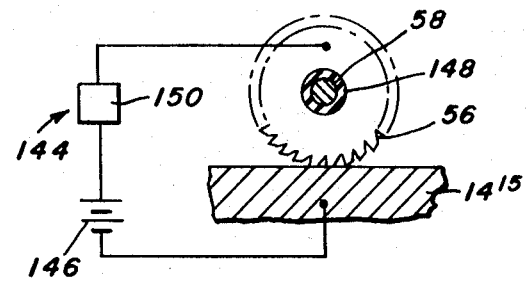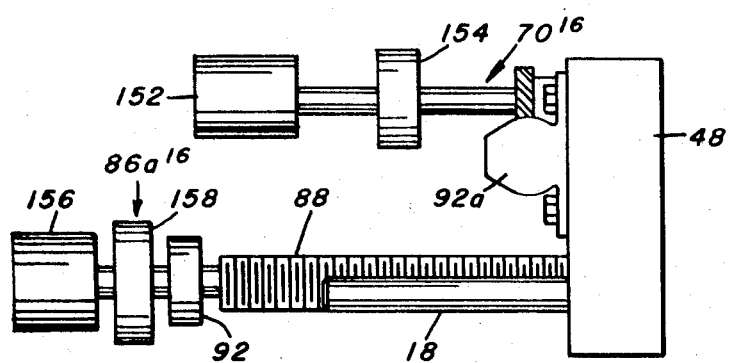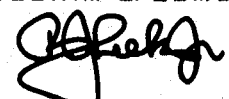

3,618,463
NOTCHING APPARATUS
Wayne L. Briney, North Irwin, and William L. Zemberry, Swissvale, Pa., assignors to United States Steel Corporation
Filed Oct. 3, 1969, Ser. No. 863,559
Int. Cl. B23c 1/20, 3/30
U.S. Cl. 90—12                22 Claims

ABSTRACT OF THE DISCLOSURE

This invention relates to notching apparatus for forming reference standard notches in workpieces for use as a reference standard in the inspection of metal products, such as pipe, bar, plate and the like, for internal discontinuities therein by ultrasonic eddy current, fringe flux systems, and the like. The notching apparatus for forming a reference notch of predetermined depth in a workpiece has a base frame positioned in a notch forming position with respect to the workpiece preparatory for the forming of the notch. A slide frame is reciprocable on the base frame and magnetic gripping means are on the base frame and are engageable with the workpiece to secure the apparatus with respect to the workpiece in the notch forming position. Notching means are reciprocable on the slide frame toward and away from the workpiece. Drive means are on the slide frame, are connected to the notching means and are utilized for causing cutting movement of the notching means. Reciprocating drive means on the slide frame are connected to th notching means and cause the notching means to cut the notch to the predetermined depth.

BACKGROUND OF THE INVENTION

The inspection of metal products for internal discontinuities by either ultrasonic, eddy-current, fringe-flux systems or the like requires adjustment of the test equipment to the desired sensitivity levels by using specimens containing simulated defects as reference standards. These reference standards must be made to accurate dimensions because they represent the required tolerance range of defect detection.

The most commonly used methods for producing contrived or simulated defects are mechanical metal removal, jet abrasives cutting, and electrical-discharge-machining or the like. The mechanical metal removal system is used most often because it can be performed with a milling machine or manually with conventional tools, such as a hammer and cold chisel, a file or the like, directly at the production line. When the operation is performed manually, the dimensions are controlled by making successive cuts and measurements until the desired depth has been attained. While machine-tool type methods, electrical-discharge-machining, jet abrasive cutting, machine-tool metal removal cutting or the like are more accurate, they must be performed in a laboratory or machine shop area remote from the production line and the transportation of large samples may be difficult, time consuming and, in many cases, impossible. Thus it is desirable to provide a means for producing good reference standards at the production line.

The manual methods, in addition to being hard to control for accuracy, are limited in application. Chisel and file notches cannot be produced on the inside of pipe. File notches can only be made transversely on pipe or round bars and cannot be made on flat surfaces. Since most defects are longitudinal and may be either on the outside or the inside of pipe, adequate reference standards should be placed correspondingly. While portable notch milling machines have been developed, none of them possess the required features of a practical unit since most of them cannot be used within small diameter pipe, are difficult to align, are cumbersome to clamp into position, have limited extension into a pipe, and are too heavy for easy handling.

OBJECTS OF THE INVENTION

It is the general object of this invention to avoid and overcome the foregoing and other difficulties of and objections to prior art practices by the provision of an improved notching apparatus which:

(a) Is portable, light in weight, and rugged in construction;

(b) Provides maximum notching precision on all machineable steels and the like;

(c) May be employed either internally in tubing or pipe, or externally on bars and pipe, or on flat plate;

(d) Produces a notch for use as a reference standard to check internal flaws in metal products;

(e) Is readily and accurately positioned on the work to provide a notch at the precise desired location on the workpiece;

(f) Provides maximum hold-down power on the workpiece;

(g) Provides a precision adjustment of the notch depth and a visual showing of the depth of the notch during the cutting operation;

(h) Can be stopped at any point in the notching operation to take an actual reading of the actual depth and then can be readily reset to the last cutting position;

(i) Is adaptable to cut a wide range of notch lengths and depths, may be readily clamped to any workpiece and automatically adjusts to the size and shape of such workpiece;

(j) Is readily aligned either radially or longitudinally with the axis of the workpiece;

(k) Provides a signal means for determining when the notch cutter first touches the workpiece;

(l) Accurately controls the length of a notch;

(m) Provides a greater accuracy in the depth of the notch than conventional machines; and (n) Is usable on the production line.

BRIEF SUMMARY OF THE INVENTION

The aforesaid objects of this invention, and other objects which will become apparent as the description proceeds, are achieved by providing improved notching apparatus for forming reference standard notches in workpieces for use as a reference standard in the inspection of metal products, such as pipe, bar, plate and the like, for internal discontinuities therein by ultrasonic eddy current, fringe flux systems, and the like. The notching apparatus for forming a reference notch of predetermined depth in a workpiece has a base frame positioned in a notch forming position with respect to the workpiece preparatory for the forming of the notch. A slide frame is reciprocable on the base frame and magnetic gripping means are on the base frame and are engageable with the workpiece to secure the apparatus with respect to the workpiece in the notch forming position. Notching means are reciprocable on the slide frame toward and away from the workpiece. Drive means are on the slide frame, are connected to the notching means and are utilized for causing cutting movement of the notching means. Reciprocating drive means on the slide frame are connected to the notching means and cause the notching means to cut the notch to the predetermined depth.

BRIEF DESCRIPTION OF THE SEVERAL VIEWS OF THE DRAWINGS

For a better understanding of this invention, reference should be had to the accompanying drawings, wherein like numerals of reference indicate similar parts throughout the several views and wherein:

FIGS. 1A and 1B are plan views of one embodiment of the improved notching apparatus with the workpiece or hollow pipe removed for clarity;

FIGS. 2A and 2B are side elevational views of the apparatus shown in FIGS. 1A, 1B and showing such apparatus positioned on the inside of a hollow pipe workpiece and the notching means in the process of cutting the notch to a predetermined depth in the inside of such hollow pipe;

FIG. 3 is a vertical sectional view taken along the line 3—3 of FIG. 2A in the direction of the arrows and showing a first counting means associated with the reciprocating drive means of the apparatus;

FIG. 4 is a vertical sectional view taken along the line 4—4 of FIG. 2A in the direction of the arrows and showing the magnetic gripping means of the apparatus positioned on the inside of the hollow pipe workpiece;

FIG. 5 is a view similar to FIG. 4 showing the magnetic gripping means positioned on a round solid bar;

FIG. 5A is an enlarged end view of one of the magnetic feet on the magnetic gripping means;

FIG. 6 is a fragmentary plan view showing a first extension means on one end of the base frame and the magnetic gripping means mounted thereon;

FIG. 7 is a fragmentary side elevational view of the reciprocating drive means and longitudinal drive means and showing a second extension means on the longitudinal drive means;

FIG. 8 is a fragmentary plan view of an alternative embodiment of the apparatus showing biasing means disposed on the slide rods of the slide frame for insuring uniform reciprocating movement of the slide frame on the base frame;

FIG. 9 is an end elevational view partially in section and showing the magnetic gripping means positioned on a convex arcuate workpiece;

FIG. 10 is a view similar to FIG. 9 and showing the magnetic gripping means positioned on a concave arcuate member;

FIG. 11 is a view similar to FIGS. 9 and 10 and showing the magnetic gripping means positioned on a flat workpiece;

FIG. 12A is a fragmentary side elevational view of a non-magnetic pipe and showing the apparatus for a present invention secured inside such hollow non-magnetic pipe by means of an external clamping means;

FIG. 12B is a side elevational view taken along the line 12B—12B of FIG. 12A in the direction of the arrows;

FIG. 13 is an end elevational view showing a non-magnetic pipe and the magnetic gripping means of the apparatus of the present invention secured inside such non-magnetic pipe by means of an internal clamping device;

FIG. 14 is a view similar to FIG. 13 showing the magnetic clamping means of the apparatus maintained on the outside of a non-magnetic pipe by means of either an internal magnetic insert or an external clamping device extending around the pipe;

FIG. 15 is a diagrammatic wiring diagram of a signal means connected between the notching means and the workpiece to signal the initial contact between such notching means and the workpiece; and FIG. 16 is a fragmentary side elevational view showing a motorized reciprocating drive means and a motorized longitudinal drive means, each provided with a counting means.

Although the principles of this invention are broadly applicable to notching apparatus, this invention is particularly adapted for use in conjunction with a notching apparatus for forming a reference notch of predetermined depth in a reference standard workpiece for use in the inspection of metal products and hence it has been so illustrated and will be so described.

DETAILED DESCRIPTION

With specific reference to the form of this invention illustrated in the drawings and referring particularly to FIGS. 1A, 1B, 2A, and 2B, a notch forming apparatus is indicated generally by the reference numeral 10. This notching apparatus 10 has a base frame 12, FIGS. 1A, 1B, 2A, and 2B, positioned in a notch forming position (FIGS. 2A and 2B) with respect to a workpiece, such as the hollow pipe 14 (FIGS. 2A, 2B, 4) during the forming of a notch 16 (FIG. 2B) on the inside of the pipe 14. This base frame 12 comprises a pair of slide rods 18 (FIGS. 1A, 1B, 2A, 2B, 4) integrated by a cross member 20 (FIGS. 1, 2) at one end (i.e. the left hand end as shown in FIGS. 1A, 1B, 2A, 2B) and at both ends thereof by magnetic gripping means 22a, 22b (FIGS. 1A, 1B, 2A, 2B, 4) as now explained. The cross member 20 is secured to the slide rods 18 by screws 19.

MAGNETIC GRIPPING MEANS

The magnetic gripping means 22a and 22b are affixed to the slide rods 18 of the base frame 12 as by screws 23 (FIGS. 1A, 1B, 2A, 2B) and are engageable with the pipe 14 to secure the apparatus 10 with respect to the workpiece 14 in the notch forming position. As shown in FIGS. 1A, 1B, 2A, 2B and 4 the magnetic gripping means 22a, 22b each has a pair of pole pieces 24 disposed about a magnetic coil 26 and affixed to such pole pieces 24 by means of screws 28 or the like. Each pole piece 24 is provided with a magnetic foot slot 30 (FIGS. 1A, 2A, 4) and has a generally cylindrical magnetic foot 32 (FIGS. 2A, 4) rotatable in the magnetic foot slot 30. The magnet feet 32 are retained in the magnetic foot slot 30 by means of a pin or screw or the like 34 (FIGS. 2A, 2B, 4) engageable with a peripheral slot 36 (FIGS. 2A, 2B) in each magnetic foot 32. As shown in FIGS. 4, 5A, each magnetic foot 32 has a radiused contact surface 38 provided with a contact slot 40 to insure two-point contact with the inside of the pipe 14.

The magnet coil 26 (FIG. 2) is connected by lines L1, L2 through a starting switch 42 to a suitable source of voltage indicated by the legend "voltage supply." After the magnetic gripping means 22a, 22b are positioned in a predetermined location in the pipe 14 (FIG. 2) the magnet starting switch 42 is closed thereby energizing the magnet coils 26 and securing the apparatus 10 (by means of the magnetic gripping means 22a, 22b) in the desired notch forming position with respect to the pipe 14.

Notching means 44 (FIGS. 1B and 2B) are reciprocable on a slide frame 46, which slide frame 46 reciprocates on the slide rods 18 as hereinafter explained.

SLIDE FRAME 46

As shown in FIGS. 1A, 1B, and 2A, 2B, the slide frame 46 comprises an end plate 48 (FIGS. 1A, 2A) an interior end plate 50 (FIGS. 1A, 2A) and a gear box 52 (FIGS. 1B, 2B) the end plate 48, interior end plate 50 and gear box 52 being integrated by support rods 54 (FIGS. 1A, 1B, 2A, 2B) and, of course, being reciprocable on the slide rods 18.

NOTCHING MEANS 44

The notching means 44 has a cutter 56 (FIGS. 1B, 2B) mounted on a stud shaft 58 (FIGS. 1B, 2B) of a right angle drive 59 (FIGS. 1B, 2B) which drive 59 is affixed to a cutter support 60 (FIGS. 1B, 2B). The cutter support 60 (FIGS. 1B, 2B) is carried by a gear shaft 62 (FIGS. 1B, 2B) which gear shaft 60 is journalled within the gear box 52 and is reciprocable vertically with respect to the pipe 14 by means of a worm gear 64 on the shaft 62 of a reciprocating or depth cutting drive means 70.

RECIPROCATING DRIVE MEANS 70

The gear 64 is engageable with a worm 66 (FIGS. 1B, 2B) disposed on an operating shaft 68 (FIGS. 1B, 2B). The operating shaft 68 extends through suitable bearings in the gear box 52, the interior end plate 50, and end plate 48 and terminates as shown in FIGS. 1A and 2A in a knurled nut 72.

This reciprocting drive means 70 is connected to the cutter 56 as described above and causes the cutter 56 to cut the notch 16 in the inside of the pipe 14 to the predetermined depth $d$ (FIG. 2B).

Drive or rotary cutting drive means 74 are also provided on the slide frame 46, are connected to the notching means 44 as hereinafter described and cause cutting movement (in this case, rotary cutting movement) of the cutter 56.

DRIVE MEANS 74

As shown in FIGS. 1A, 1B, 2A, 2B, the drive means 74 has a motor 76 mounted by means of a bracket 78 (FIG. 1A) on the interior end plate 50 and actuated by a motor starting switch 77. For the purpose of connecting a drive shaft 79 of the motor 76 to the cutter 56, a flexible shaft 80 extends from a coupling 81 on the right-hand end of the motor shaft 79 to a coupling 82 for joining the flexible shaft 80 to a shaft 61 of the right angle drive 59 on the cutter support 60. Gears (not shown) within the drive 59 connect the shaft 61 to the stud 58 on which the cutter 56 is mounted. Rotation of the flexible shaft 80, the horizontal shaft 61, and interconnected stud shaft 58 cause rotary cutting movement of the cutter 56 in the direction of the arrow as shown in FIG. 2B. For the purpose of reciprocating the cutter 56 along the inside of the pipe 14 to cut the notch 16 to a predetermined length L, FIG. 2B, a longitudinal drive means 86 is provided.

LONGITUDINAL DRIVE MEANS 86

The longitudinal drive means 86 (FIGS. 1A, 1B, 2A, 2B) comprises a screw 88, rotatable at one end (in this case the left-hand end as viewed in FIGS. 1A, 2A) by means of an unthreaded end portion 90 in the cross member 20. The screw 88 engages a mating thread in the end plate 48 to cause horizontal movement (as desired) of the slide frame 46 and hence the cutter 56 on the slide rods 18 in the direction of the arrows shown in FIGS. 1B and 2B. The notch length L (FIG. 2B) is controlled by a stop collar 89 (FIG. 2B) fastened to slide rods 18.

ALTERNATIVE EMBODIMENTS

It will be understood by those skilled in the art that alternatively as shown in FIG. 5, the magnetic gripping means 22a of the apparatus 10 may be maintained in a notch forming position (FIG. 5) on a solid bar $14^5$.

In FIG. 16, the apparatus 10 has a first counter means, such as the first counter 92 associated with the longitudinal drive means $86a^{16}$ (FIG. 16) for the purpose of counting the number of turns of the screw 88 of the longitudinal drive means $86a^{16}$ (FIG. 16) to indicate the length L of the notch 16. The first counter 92 may be similar to the second counter means (i.e. second counter 92a) shown in FIGS. 1A and 2A, 16 and associated with the reciprocating drive means 70.

The second counter 92a (FIGS. 1 and 2) associated with the reciprocating drive means 70 counts the number of turns of the operating shaft 68 of the reciprocating drive means 70 and thereby indicates a depth $d$ (FIG. 2B) of the notch 16. The second counter 92a has a first gear 94 (FIGS. 1A, 2A, 3) on the operating shaft 68 engageable with a second gear 96 on a counter shaft 98 (FIGS. 1A, 2A, 3) which counter shaft 98 also carries a counter 100 (FIG. 3).

Referring now to FIG. 6, a first extension means is provided on one end of the base frame 12. Such first extension means provides the slide rods $18^6$ with square holes 102 in their end portions for the reception of end portions 104 of extension slide rods 106 of the first extension means to extend the length of the apparatus 10 and the length L of the notch 16. To accomplish this, the end portions 104 of extension slide rods 106 are secured by means of set screws 108 in the square holes 102 and the magnetic gripping means 22d are mounted on the extension rods 106 by means of set screws 103.

For the same purpose of cutting a longer notch 16 in the pipe 14, a second extension means (FIG. 7) such as the extension thread 110 is mounted on the screw $88^7$ of the longitudinal drive means $86^7$ by means of a square hole 112 in the extension screw 110 for reception of an end portion 114 of the screw $88^7$ in such square hole 112. A screw 116 or the like retains each end portion 114 in its associated square hole 112.

For the purpose of providing uniform longitudinal reciprocable movement of the slide frame 46 (FIG. 8) on the base frame 12, biasing means such as springs 118 are disposed about the slide rods 18 between the interior end plate 50 and suitable stops 120 affixed, as by screws 122 or the like, to the slide rods 18.

In FIG. 9 a non-magnetic convex arcuate workpiece $14^9$ is disposed, as by wedges 122', on a flat mounting plate 124. For the purpose of securing the magnetic gripping means 22a in the notch forming position on the inside surface of the arcuate member $14^9$, a jack 126 of the type S-190 manufactured by L. S. Starrett Company, Athol, Mass., is disposed between a yoke 128 upstanding from the pole pieces 24 of the magnetic gripping means 22a and a cross bar 130. The cross bar 130 is secured with respect to the mounting plate 124 by means of bolts 132 and nuts 134.

FIG. 10 shows a magnetic gripping means 22a mounted on a non-magnetic concave arcuate workpiece $14^{10}$ in a manner similar to that shown in FIG. 9.

In FIG. 11, the magnetic gripping means 22a is mounted on a non-magnetic flat plate-like workpiece $14^{11}$.

In FIGS. 12A, 12B where the workpiece $14^{12a}$ is formed of a non-magnetic material and it is desired to form the notch 16 on the inside of a non-magnetic hollow pipe $14^{12a}$ (FIGS. 12A–12B) a right angle extension arm 136 is secured by bolts 138 to the cross member 20 and a jack $126^{12a}$ is disposed between the extension arm 136 and the outside of the pipe $14^{12a}$.

Alternatively, as shown in FIG. 13 the magnetic gripping means 22a is provided with a yoke 128 upstanding from the pole pieces 24 of the magnetic gripping means 22a and a jack $126^{13}$ is disposed between the yoke 128 and the inside of the non-magnetic pipe $14^{13}$.

If the apparatus is to be mounted on the outside of a non-magnetic pipe $14^{14}$ (FIG. 14), the magnetic gripping means 22a of the apparatus 10 may be provided with lugs 138' on the pole pieces 24 to permit the extension of chain 140 from the lugs 138 and around the pipe $14^{14}$. The chain 140 terminates in a chain wrench or vise 142 of the type BS810 manufactured by Rigid Tool Co., Elyria, Ohio, Alternatively, an arcuate magnetic insert 141 may be positioned on the inside of the pipe $14^{14}$ as by a jack $126^{14}$ and the chain 140 etc. may be dispensed with. The magnetic feet 32 will attract the magnetic insert 141 thus securing the apparatus 10 on the outside of the pipe $14^{14}$.

SIGNAL MEANS 144

For the purpose of indicating when initial contact is made between the cutter 56 and a workpiece, such as the flat workpiece $14^{15}$ (FIG. 15), the signal means 144 shown in FIG. 15 is utilized. Such signal means 144 has a battery 146 connected to the cutter 56 (which cutter 56 is insulated by a bushing 148 from the stud shaft 58) and through a signal 150, such as a light, buzzer, or the like to the workpiece $14^{15}$.

It will be readily understood by those skilled in the art that the reciprocating drive means $70^{16}$ shown in FIG. 16 may comprise a motor 152 connected to a gear reduction unit 154 and thence to the second counter 92a. Also, as shown in FIG. 16, the screw 88 of the longitudinal drive means $86^{16}$ may also be provided with a motor 156 and a gear reduction unit 158.

As shown in FIGS. 2A, 2B the apparatus 10 has cleaning means, such as the rubber washers 160 on the slide rods 18 of the base frame 12, in frictional engagement with the slide rods 18. These washers 160 are engageable and movable by the end plate 48, interior end plate 50 and gear box 52 to frictionally clean the sliding path of movement of these parts on the slide rods 18.

Further the magnetic feet 32 may be of the permanent magnet type, such as for example type 3002 manufactured by Enco Manufacturing Company, Chicago, Ill.

SUMMARY OF THE ACHIEVEMENT OF THE OBJECTS OF THE INVENTION

It will be recognized by those skilled in the art that the objects of this invention have been achieved by providing an improved notching apparatus 10 (FIGS. 1A–16) which is portable, light in weight, and rugged in construction; provides maximum notching precision on all machineable steels and the like; may be employed either internally in tubing or pipe or externally on bars $14^5$ (FIG. 5), and pipe 14 (FIGS. 2A, 2B), $14^{12a}$ (FIG. 12A), $14^{13}$ (FIG. 13), $14^{14}$ (FIG. 14), on flat plate $14^{11}$ (FIG. 11), or arcuate members $14^9$ (FIG. 9), $14^{10}$ (FIG. 10); produces a notch 16 (FIG. 2B) for use as a reference standard to check internal flaws in such metal products; is readily and accurately positioned on the workpiece 14 (FIGS. 2A, 2B) etc. to provide a notch 16 at the precise desired location on the workpiece 14 (FIGS. 2A, 2B) etc.; provides maximum hold-down power on the workpiece 14 (FIGS. 2A, 2B) etc.; provides a precision adjustment of the notch depth $d$ (FIG. 2B) and a visual showing of the depth $d$ of the notch 16 during the cutting operation; can be stopped at any point in the notching operation to take an actual reading of the actual depth $d$ (FIG. 2B) of the notch 16 and then can be readily reset to the last cutting position; is adaptable to cut a wide range of notch lengths L (FIG. 2B) and depths $d$ (FIG. 2B); may be readily clamped to any workpiece 14 (FIGS. 2A, 2B) etc. and automatically adjusts to the size and shape of such workpiece 14 (FIGS. 2A, 2B) etc.; it readily aligned either radially or longitudinally with the axis of the workpiece 14 (FIGS. 2A, 2B) etc.; provides a signal means 150 (FIG. 15) for determining when the notch cutter 56 first touches the workpiece 14 (FIGS. 2A, 2B) etc.; accurately controls the length L (FIG. 2B) of a notch 16; provides a greater accuracy in the depth $d$ (FIG. 2B) of the notch 16 than conventional machines; and is usable on the production line.

While in accordance with the patent statutes a preferred and alternative embodiment of this invention has been illustrated and described in detail, it is to be particularly understood that the invention is not limited thereto or thereby.

We claim:

1. Notching apparatus for forming a notch of predetermined depth in a workpiece, said notching apparatus having:
   (a) a base frame positioned in a notch forming position with respect to said workpiece preparatory for the forming of said notch;
   (b) a slide frame reciprocable on said base frame;
   (c) magnetic gripping means on said base frame and engageable with said workpiece to secure said base frame to said workpiece and said apparatus with respect to said workpiece in said notch forming position;
   (d) notching means having a cutter reciprocable on said slide frame toward and away from said workpiece;
   (e) drive means on said slide frame, connected to said notching means, for causing rotary cutting movement of said notching means;
   (f) flexible means connecting said drive means remotely to said notching means to allow movement of said notching means toward and away from said workpiece relative to said drive means; and
   (g) reciprocating drive means on said slide frame, connected to said cutter, for controlling the depth to which said cutter cuts said notch without reciprocating movement of said reciprocating drive means toward and away from said workpiece.

2. The apparatus recited in claim 1 and having a longitudinal drive means on said base frame, connected to said slide frame, for reciprocating said notching means along said workpiece to cut said notch to a predetermined length.

3. The apparatus recited in claim 2 and having a first counter means associated with said longitudinal drive means for counting the number of turns of said longitudinal drive means and thereby indicating the length of said notch.

4. The apparatus recited in claim 1 and having a second counter means associated with said reciprocating drive means for counting the number of turns of said reciprocating drive means and thereby indicating the depth of said notch.

5. The apparatus recited in claim 1 and having a first extension means on one end of said base frame, and said magnetic gripping means on said first extension means to extend the length of said apparatus and the length of said notch.

6. The apparatus recited in claim 1 and having a second extension means on said longitudinal drive means for cutting a longer notch in said workpiece.

7. The apparatus recited in claim 1 and having biasing means on said base frame for providing uniform longitudinal reciprocable movement of said slide frame on said base frame.

8. The apparatus recited in claim 1 wherein said workpiece is magnetic and said magnetic gripping means is of the permanent magnet type.

9. The apparatus recited in claim 1 wherein said workpiece is magnetic and said magnetic gripping means is of the electric magnet type.

10. The apparatus recited in claim 1 wherein said workpiece is a hollow member and said notching means engages the inside of said hollow member.

11. The apparatus recited in claim 1 wherein said notching means engages the outside of said workpiece.

12. The apparatus recited in claim 1 wherein said workpiece is an arcuate member and said notching means engages one side of said arcuate member.

13. The apparatus recited in claim 1 wherein said workpiece is a flat member and said notching means engages one side of said flat member.

14. The apparatus recited in claim 1 wherein said workpiece is a non-magnetic hollow member and said notching means engages the inside of said hollow member and said apparatus has external clamping means on said base frame for engaging the outside of said hollow member to secure said apparatus in said notch forming position.

15. The apparatus recited in claim 1 wherein said workpiece is a non-magnetic hollow member and said notching means engages the inside of said hollow member and said apparatus has internal clamping means on said base frame for engaging the inside of said hollow member to secure said apparatus in said notch forming position.

16. The apparatus recited in claim 1 wherein said workpiece is a non-magnetic hollow member and said notching means engages one side of the inside and the outside of said hollow member and having a magnetic member on the other side of said inside and said outside of said hollow member adjacent said magnetic gripping means to secure said apparatus in said notch forming position.

17. The apparatus recited in claim 1 wherein said workpiece is a non-magnetic hollow member and said apparatus is positioned in said notch forming position on the outside of said hollow member and having external clamping means extending around said hollow member to secure said apparatus in said notch forming position.

18. The apparatus recited in claim 1 and having a signal means connected to said notching means and said workpiece to indicate initial contact therebetween.

19. The apparatus recited in claim 1 wherein said magnetic gripping means is provided with a pair of opposed magnetic foot slots, each having a magnetic foot rotatable in said magnetic foot slot.

20. The apparatus recited in claim 19 wherein each of said magnetic feet has a radiused contact surface.

21. The apparatus recited in claim 20 wherein said magnetic gripping means is provided with a slot disposed between said magnet foot slots to insure two point contact with said workpiece and said magnetic feet.

22. The apparatus recited in claim 1 and having cleaning means mounted in frictional engagement with said base frame and engageable by said slide frame to move on said base frame to clean said base frame.

References Cited

UNITED STATES PATENTS

| | | | |
|---|---|---|---|
| 2,372,913 | 4/1945 | Schmidt | 90—11 R |
| 3,371,257 | 2/1968 | Warren et al. | 318—39 |
| 3,403,597 | 10/1968 | Beckman et al. | 90—12 |
| 3,464,313 | 9/1969 | Shay et al. | 90—12 |
| 3,476,013 | 11/1969 | Zemberry et al. | 90—12 |
| 3,485,138 | 12/1969 | Staehle | 90—11 R |

GIL WEIDENFELD, Primary Examiner

U.S. Cl. X.R.

90—11 R, 15, DIG. 8